(12) United States Patent
Kweon et al.

(10) Patent No.: US 6,984,469 B2
(45) Date of Patent: Jan. 10, 2006

(54) POSITIVE ACTIVE MATERIAL FOR RECHARGEABLE LITHIUM BATTERIES AND METHOD OF PREPARING SAME

(75) Inventors: Ho-Jin Kweon, Cheonan (KR); Jun-Won Suh, Cheonan (KR); Won-Il Jung, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 95 days.

(21) Appl. No.: 09/966,572

(22) Filed: Sep. 25, 2001

(65) Prior Publication Data

US 2002/0071991 A1 Jun. 13, 2002

(30) Foreign Application Priority Data

Sep. 25, 2000 (KR) ......................................... 2000-56245
Jun. 26, 2001 (KR) ......................................... 2001-36766

(51) Int. Cl.
*H01M 4/58* (2006.01)

(52) U.S. Cl. ................. 429/231.95; 429/137; 429/218.1
(58) Field of Classification Search ................. 429/137, 429/232, 231.1, 218.1, 231.3, 223, 623.5, 429/224, 231.95; 29/623.5; 427/299
See application file for complete search history.

(56) References Cited

U.S. PATENT DOCUMENTS

| 4,959,282 | A | | 9/1990 | Dahn et al. | |
|---|---|---|---|---|---|
| 5,705,291 | A | * | 1/1998 | Amatucci et al. | ............ 429/137 |
| 5,733,685 | A | | 3/1998 | Wang | |
| 5,783,328 | A | * | 7/1998 | Wang | .......................... 429/137 |
| 5,939,380 | A | | 8/1999 | Wang | |
| 6,372,385 | B1 | | 4/2002 | Kweon et al. | |
| 6,531,220 | B1 | | 3/2003 | Kweon et al. | |
| 6,558,844 | B2 | * | 5/2003 | Howard et al. | ........... 429/231.1 |
| 6,653,021 | B2 | | 11/2003 | Kweon et al. | |
| 2002/0071990 | A1 | | 6/2002 | Kweon et al. | |
| 2002/0076613 | A1 | * | 6/2002 | Lee et al. | ................. 429/231.1 |
| 2002/0119372 | A1 | * | 8/2002 | Zhang | ...................... 429/218.1 |

FOREIGN PATENT DOCUMENTS

| CH | 1266288 A | 9/2000 |
|---|---|---|
| JP | 9-55210 | 2/1997 |
| JP | 11-16566 | 1/1999 |

OTHER PUBLICATIONS

Amatucci et al; 'Surface treatments of $Li_{1+x}Mn_{2-x}O_4$ spinels for improved elevated temperature performance'; Solid State Ionics 104 (1997);. pp. 13–16.
U.S. Appl. No. 09/963,872, Ho–Jin Kweon et al.
U.S. Appl. No. 09/964,263, Ho–Jin Kweon et al.

* cited by examiner

*Primary Examiner*—Michael Barr
*Assistant Examiner*—Monique Wills
(74) *Attorney, Agent, or Firm*—Christie, Parker and Hale, LLP

(57) ABSTRACT

A positive active material for a rechargeable lithium battery is provided. The positive active material includes a core having a lithiated compound and at least two surface-treatment layers on the core, and each of the two surface-treatment layers includes at least one coating element. Alternatively, the positive active material includes at least one surface-treatment layer on the core, wherein the surface treatment at least comprises at least two coating element-included oxides.

21 Claims, 7 Drawing Sheets

POSITIVE ACTIVE MATERIAL FOR RECHARGEABLE LITHIUM BATTERIES AND METHOD OF PREPARING SAME

CROSS REFERENCE TO RELATED APPLICATION

This application is based on and claims priority of Korean Patent Application Nos. 2000-56245 filed on Sep. 25, 2000 and 2001-36766 filed on Jun. 26, 2001 in the Korean Industrial Property Office, the contents of which are incorporated herein by reference.

FIELD OF THE INVENTION

The present invention relates to a positive active material for a rechargeable lithium battery and a method of preparing the same, and more particularly, to a positive active material for a rechargeable lithium battery having improved thermal safety and a method of preparing the same.

BACKGROUND OF THE INVENTION

Rechargeable lithium batteries use materials from or into which lithium ions are deintercalated or intercalated for positive and negative active materials. For an electrolyte, an organic solvent or polymer is used. Rechargeable lithium batteries produce electric energy as a result of changes in the chemical potentials of the active materials during the intercalation and deintercalation reactions of lithium ions.

For the negative active material in a rechargeable lithium battery, metallic lithium was used in the early days of development. Recently, however, carbon materials, which intercalate lithium ions reversibly, are extensively used instead of the metallic lithium due to problems of high reactivity toward electrolyte and dendrite formation of the metallic lithium. With the use of carbon-based active materials, the potential safety problems which are associated with the metallic lithium can be prevented while achieving relatively high energy density, as well as much improved cycle life. In particular, boron may be added to carbonaceous materials to produce boron-coated graphite (BOC) in order to increase the capacity of the carbonaceous materials.

For the positive material in the rechargeable lithium battery, chalcogenide compounds into or from which lithium ions are intercalated or deintercalated are used. Typical examples include $LiCoO_2$, $LiNiO_2$, $LiNi_{1-x}Co_xO_2$ ($0<x<1$), and $LiMnO_2$. Manganese-based materials such as $LiMn_2O_4$ and $LiMnO_2$ are easier to prepare and less expensive than the other materials and are environmentally friendly. However, manganese-based materials have relatively low capacity. $LiNiO_2$ is inexpensive and has a high capacity, but is difficult to prepare in the desired structure and is relatively less stable in the charged state causing a battery safety problem. $LiCoO_2$ is relatively expensive, but widely used as it has good electrical conductivity and high cell voltage. Most commercially available rechargeable lithium batteries (at least about 95%) use $LiCoO_2$ as the positive active material.

Although $LiCoO_2$ exhibits good cycle life characteristics and good flat discharge profiles, there are still demands to improve electrochemical properties such as good cycle life and high power density.

One way to satisfy such a demand is to substitute a part of the Co from $LiCoO_2$ with other materials. Sony studied $Li_xCo_{1-y}Al_yO_2$ by doping about 1 to 5 percent by weight of $Al_2O_3$ into $LiCoO_2$. A&TB (Asahi & Toshiba Battery Co.) studied a Sn-doped Co-based active material by substituting a part of Co from $LiCoO_2$ with Sn.

Even though these studies have progressed, there are still demands for improving good thermal safety.

SUMMARY OF THE INVENTION

It is an object of the present invention to provide a positive active material for a rechargeable lithium battery exhibiting improved thermal safety.

It is another object to provide a method of preparing for the same.

In order to achieve these objects, the present invention provides a positive active material for a rechargeable lithium battery including a core, and at least one surface-treatment layer on the core. The core includes at least one lithiated compound and the surface-treatment layer includes at least two coating-element-included oxides. Alternatively, the positive active material includes at least two surface-treatment layers on the core. Each of the two surface-treatment layers includes at least one coating element.

The coating element preferably includes at least one element selected from the group consisting of Mg, Al, Co, K, Na, Ca, Si, Ti, Sn, V, Ge, Ga, B, As and Zr.

The surface-treatment layer may be a single layer, or multiple layers. The single layer includes at least two coating elements. Each of the multiple layers includes at least one coating element. The coating element of the one layer in the multiple layers may be different from that of another layer.

The present invention further provides a method of preparing the positive active material for the rechargeable lithium battery. In this method, a lithiated compound is coated with an organic or an aqueous solution including at least one coating-element source, and the coated lithiated compound is heat-treated.

The coating and heat-treatment steps are referred to as a "treating process". The treating process may be performed using a coating solution which includes more than one coating element so that a single coated layer may include more than one coating element. Alternatively, the treating process may be performed using at least two coating solutions to form multiple layers.

BRIEF DESCRIPTION OF THE DRAWINGS

A more complete appreciation of the invention, and many of the attendant advantages thereof, will be readily apparent as the same becomes better understood by reference to the following detailed descriptions when considered in conjunction with the accompanying drawings, wherein.

DETAILED DESCRIPTION OF THE INVENTION

Figure 1:
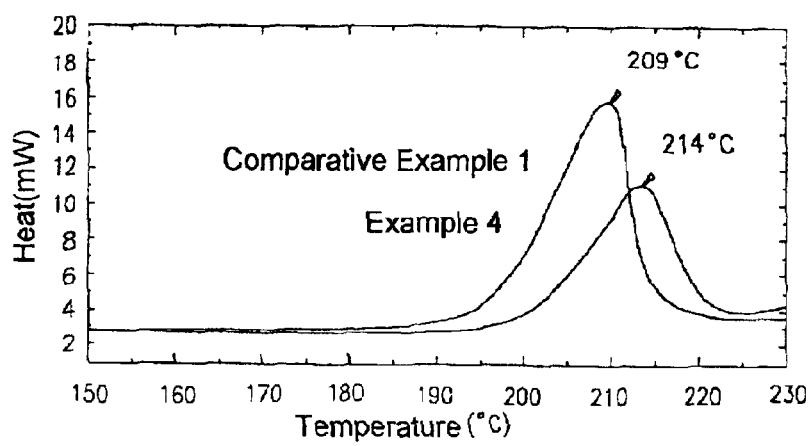
FIG. 1 is a graph illustrating the differential scanning calorimetry (DSC) results of positive active materials according to Example 4 of the present invention and Comparative Example 1.

A positive active material for a rechargeable lithium battery of the present invention includes a core and at least one surface-treatment layer formed on the core. The surface-treatment layer may be a single layer including at least two coating elements, or multiple layers of which one layer includes at least one coating element different from that of another layer. Each of the two layers of the multiple layers includes at least one coating element.

The core includes at least one lithiated compound, and preferably includes at least one lithiated compound represented by the formulas 1 to 11. It is more preferable that the compounds include one or more of lithium-cobalt chalcogenide, lithium-manganese chalcogenide, lithium-nickel chalcogenide, and lithium-nickel-manganese chalcogenide.

| | |
|---|---|
| $Li_xMn_{1-y}M'_yA_2$ | (1) |
| $Li_xMn_{1-y}M'_yO_{2-z}X_z$ | (2) |
| $Li_xMn_2O_{4-z}A_z$ | (3) |
| $Li_xMn_{2-y}M'_yA_4$ | (4) |
| $Li_xM_{1-y}M''_yA_2$ | (5) |
| $Li_xMO_{2-z}A_z$ | (6) |
| $Li_xNi_{1-y}Co_yO_{2-z}A_z$ | (7) |
| $Li_xNi_{1-y-z}Co_yM''_zA_\alpha$ | (8) |
| $Li_xNi_{1-y-z}Co_yM''_zO_{2-\alpha}X_\alpha$ | (9) |
| $Li_xNi_{1-y-z}Mn_yM'_zA_\alpha$ | (10) |
| $Li_xNi_{1-y-z}Mn_yM'_zO_{2-\alpha}X_\alpha$ | (11) | wherein, $0.95 \leq x \leq 1.1$, $0 \leq y \leq 0.5$, $0 \leq z \leq 0.5$, $0 < \alpha \leq 2$, M is Ni or Co, M' is at least one element selected from the group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa, M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa, A is selected from the group consisting of O, F, S, and P, and X is selected from the group consisting of F, S, and P.

The coating elements each preferably includes at least one element selected from the group consisting of Mg, Al, Co, K, Na, Ca, Si, Ti, V, Ga, Ge, B, A and Zr.

Useful organic solvents include hexane, chloroform, tetrahydrofuran, ether, methylene chloride, acetone, or alcohols such as methanol, ethanol or isopropanol.

The content of the coating element of the surface-treatment layer is preferably from $2 \times 10^{-5}$ to 1 wt % based on the weight of the positive active material, and more preferably from 0.001 to 1 wt %.

According to one example of the present invention, the core includes lithium-cobalt chalcogenide compounds and at least two surface-treatment layers formed on the core. One of the two surface-treatment layers includes $Al_2O_3$. According to another example of the present invention, the core includes a lithium-manganese or lithium-cobalt chalcogenide compound and at least two surface-treatment layers formed on the core. One of the two surface-treatment layers include B-included oxide.

During the charging and discharging of the positive active material of the present invention, phase transition occurs at a voltage ranging from 4.0 to 4.3 V. The positive active material exhibits improved thermal safety, since the positive active material has the exothermic reaction temperature of 230° C. or greater, and the evolved heat value is small.

A preparation of the positive active material of the present invention will be illustrated below in more detail.

At least one lithiated compound is coated (encapsulated) with an organic or an aqueous solution including a coating-element source (hereinafter, referred to as a "coating solution").

The coating element in the coating element source may be any element that is capable of being dissolved in organic solvent or water. Examples are Mg, Al, Co, K, Na, Ca, Si, Ti, V, Sn, Go, Ga, B, As, Zr, and any mixture thereof.

The coating solution is obtained by dissolving the coating-element source in an organic solvent or water, and preferably refluxing the resulting mixture. The coating-element source includes a coating element or a coating-element-included alkoxide, salt or oxide of the coating element. Suitable coating-element sources may be chosen from the coating element, the coating-element-included alkoxide, salt or oxide according to the type of the solvent, which is well known to one skilled in the related arts. For example, if an organic solvent is used for the solvent, then for the coating element or the coating-element-included alkoxide, salt or oxide may be used for the coating-element source. If water is used for the solvent, then only the coating-element-included salt or oxide may be used for the coating-element source. For example, a boron solution may be prepared by dissolving $HB(OH)_2$, $B_2O_3$ or $H_3BO_3$ in either an organic solvent or water.

An exemplary organic solution is a coating element-included alkoxide solution. The alkoxide solution may be prepared by dissolving the coating element in an alcohol such as methanol, ethanol or isopropanol, and refluxing them, or by dissolving a coating element-included alkoxide such as methoxide, ethoxide or isopropoxide in alcohol. For example, tetraethylorthosilicate solution is prepared by dissolving silicate in ethanol. The organic or aqueous solution may also be available through commercial purchase.

Useful salts or oxides also include a form of vanadate, such as ammonium vanadate ($NH_4(VO)_3$) or vanadium oxide ($V_2O_5$).

The concentration of the coating-element source in the coating solution may be 0.1 to 50 wt %, based on the weight of the coating solution, and preferably 1 to 20 wt %. When the concentration thereof is below 0.1 wt %, the effect obtained by coating the solution onto the lithiated compound may not be sufficient. Whereas, when the concentration of coating-element source is more than 50 wt %, the resultant coating layer may become undesirably thick.

The coating process may be performed by a sputtering method, a chemical vapor deposition (CVD) method, an impregnation method such as dip coating, or by any other general-purpose coating technique. Any other coating techniques, if available and applicable, may be as effective as the methods described herein. A conventional method of the coating process involves an impregnation step of the lithiated compound in the solution. The impregnation method includes steps in which the lithiated material is mixed with the coating solution (mixing step), and the resulting wet lithiated material is then separated from the solution (solvent-removing step) to remove excess solution.

The wet solution-coated lithiated compound may be dried in an oven at 120° C. for several hours to obtain dry coated lithiated compound.

The resulting compound is heat-treated. The heat-treating process is performed at the temperature ranging from 200 to 800° C. for 1 to 20 hours. In order to prepare a more uniform oxide-coated positive active material, the heat-treating process is preferably performed under flowing dry air. When the heat-treatment temperature is lower than 200° C., a good lithium ion-conducting coating may not be formed resulting in a failure in facilitation of free movement of the lithium ions through the interface of the active material and electrolyte. When the heat-treatment temperature is higher than 800° C., a poor lithium ion-conduction coating is formed at the surface of the active material.

During the heat-treatment process, the coated material is changed into an oxide to form an oxide layer (surface-treatment layer) on the lithiated compound.

Hereinafter, the coating and the heat-treating process are referred to as a "treating process".

The treating process may be performed once or more. Therefore, when the coating process is performed once, an AB oxide single layer forms on the lithium-based mixture. (A and B are dependent and at least one selected from the group consisting of Mg, Al, Co, K, Na, Ca, Si, Ti, Sn, V, Ge, Ga, B, As, and Zr.) In addition, when the coating process is performed two or more times, a double-layer including a first layer of A oxide and a second layer of B oxide thereon, or multiple layers, form.

It is preferable that the thickness of the surface-treatment layer is from 1 to 100 nm, and is more preferable that the thickness of the surface-treatment layer is from 1 to 50 nm. When the thickness of the surface-treatment layer is less than 1 nm, the effect obtained from the coating may not be realized. When the thickness of the surface-treatment layer is greater than 100 nm, the surface-treatment layer may excessively thicken.

After the heat-treatment process, a cooling process is performed. The cooling process may be a quenching process or a slow-cooling process. The quenching process is performed by cooling the heat-treated material at a temperature of 200° C. to 500° C. in a furnace and transferring the cooled material into the air at ambient temperature. It is preferable that the quenching process is performed at a rate of 0.5° C./min or faster. Alternatively, the heat-treated material may be slow-cooled in a furnace at a temperature lower than 100° C. and then transferred into the air at ambient temperature.

For the lithiated compound, a commercial lithiated compound may be used, or a lithiated compound synthesized by the following procedure may be used.

Lithium sources are mixed with metal sources in a desired ratio. The lithium source may be any material known in the related arts, some of which include lithium nitrate, lithium acetate, and lithium hydroxide. For the metal sources, manganese sources, cobalt sources, nickel sources, or nickel-manganese sources may be used. Typical examples of the manganese sources are manganese acetate and manganese dioxide. Typical examples of the cobalt sources are cobalt hydroxide, cobalt nitrate and cobalt carbonate, whereas typical examples of the nickel sources are nickel hydroxide, nickel nitrate, and nickel acetate. The nickel-manganese sources may be produced by co-precipitating nickel and manganese salts. Fluoride sources, sulfur sources or phosphorous sources may be further used together with the manganese sources, cobalt sources, nickel sources or nickel-cobalt sources. The fluoride sources may be manganese fluoride or lithium fluoride and the sulfur sources may be manganese sulfide or lithium sulfide. An example of a phosphorous source is $H_3PO_4$. Note that the above list of manganese, cobalt, nickel, nickel-manganese, manganese fluoride and lithium fluoride, sulfur and phosphorous sources is not an exhaustive list.

In order to facilitate the reaction of the lithium sources and the metal sources, a small amount of solvent may be added to the mixture. The solvent may be ethanol, methanol, water or acetone. The mixture may then be ground in a mortar thoroughly.

The resulting mixture is heat-treated (the first heat-treatment step) at about 400 to 600° C., for 1 to 5 hours to produce a semi-crystalline positive active material precursor powder. Although other temperatures are possible, if the first heat-treatment step temperature is less than 400° C., the metal sources may not react completely with the lithium sources. Thereafter, the first heat-treated active material precursor powder is remixed thoroughly to distribute the lithium sources uniformly.

The semi-crystalline precursor powder is heat-treated (the second heat-treatment step) again at about 700 to 900° C. for about 10 to 15 hours to produce a crystalline positive active material. As described above, if the first heat-treatment step temperature is less than 400° C., the lithium sources may not react completely with the metal sources. If the second heat-treatment step temperature is lower than 700° C., it may be difficult to form a crystalline material. The heat-treatment step may be performed by increasing the temperature at a rate of 1 to 5° C./min under dry air or flowing air. The heat-treated mixture is allowed to stand at the first and second heat-treatment temperatures for predetermined lengths of time, and then the mixture is cooled passively. Using this process, a desired particulate forms of a compound selected from the group consisting of the compounds represented by formulas 1 to 11 may be prepared.

The following examples further illustrate the present invention, but the invention is not limited by these examples.

COMPARATIVE EXAMPLE 1

$LiCoO_2$ powder having a 10 μm average diameter, a carbon conductive agent, and polyvinylidene fluoride binder were weighed in a weight ratio of 94:3:3 and were mixed in N-methyl pyrrolidone to prepare a slurry, and the slurry was cast (coated) on an aluminum foil. The cast foil was dried, and the resulting cast film was compressed to make a positive electrode. Using the positive electrode as a working electrode and lithium metal as a counter electrode, a coin-type half-cell was fabricated in an Ar-purged glove box. As an electrolyte, 1 M LiPF$_6$ solution of ethylene carbonate and dimethyl carbonate in 1:1 volume ratio, was used.

COMPARATIVE EXAMPLE 2

A coin-type half-cell was fabricated by the same procedure as in Comparative Example 1, except that Li$_{1.03}$Ni$_{0.69}$Mn$_{0.19}$Co$_{0.1}$Al$_{0.07}$Mg$_{0.07}$O$_2$ having a 10 μm average diameter was used.

COMPARATIVE EXAMPLE 3

A coin-type half-cell was fabricated by the same procedure as in Comparative Example 1, except that LiNi$_{0.9}$Co$_{0.1}$Sr$_{0.002}$O$_2$ having a 10 μm average diameter was used.

COMPARATIVE EXAMPLE 4

A coin-type half-cell was fabricated by the same procedure as in Comparative Example 1, except that LiMn$_2$O$_4$ having a 10 μm average diameter was used.

EXAMPLE 1

Al-isopropoxide powder was dissolved in ethanol to prepare a 5% Al-isopropoxide solution.

100 g of LiCoO$_2$ powder having a 10 μm average diameter was added to the 5% Al-isopropoxide solution followed by mixing for about 10 minutes to coat the powder with the solution. The wet mixture was allowed to stand for about 30 minutes to have the excess solvent evaporated.

The partially dried mixture was transferred to a furnace. The mixture was heat-treated in the furnace at 300° C. for 10 hours under flowing air, and the heat-treated mixture was cooled in the furnace. The heat-treatment temperature was elevated to 300° C. at a rate of 3° C./min. When the temperature of the furnace was 200° C., the heat-treated material was transferred into the air at ambient temperature and allowed to stand under atmosphere. Then, the cooled material was ground and sieved to collect a powder and to use it as a positive active material coated with aluminum oxide.

Using the positive active material, a coin-type half-cell was fabricated by the same procedure as in Comparative Example 1.

EXAMPLE 2

A coin-type half-cell was fabricated by the same procedure as in Example 1, except that the heat-treatment was performed at 500° C. instead of 300° C.

EXAMPLE 3

A coin-type half-cell was fabricated by the same procedure as in Example 1, except that the heat-treatment was performed at 700° C. instead of 300° C.

EXAMPLE 4

The aluminum oxide-coated LiCoO$_2$ of Example 1 was added to a tetraethyl orthosilicate solution to prepare a slurry. The resulting material was allowed to stand for about 30 minutes to allow the excess solvent to evaporate. The resulting material was further heat-treated at 300° C. for 10 hours (second heat-treatment step) to prepare a positive active material with a first aluminum oxide layer and a second silicon oxide layer on the first layer.

Using the positive active material, a coin-type half-cell was fabricated by the same procedure as in Comparative Example 1.

EXAMPLE 5

A coin-type half-cell was fabricated by the same procedure as in Example 4, except that the aluminum oxide-coated LiCoO$_2$ of Example 2 was used instead of that of Example 1 and the second heat-treatment was performed at 700° C. instead of 300° C.

EXAMPLE 6

A coin-type half-cell was fabricated by the same procedure as in Example 4, except that the aluminum oxide-coated LiCoO$_2$ of Example 3 was used instead of that of Example 1 and the second heat-treatment was performed at 500° C. instead of 300° C.

EXAMPLE 7

A coin-type half-cell was fabricated by the same procedure as in Example 4, except that a mixture of the Al-isopropoxide solution and tetraethyl orthosilicate solution was used instead of the 5% Al-isopropoxide solution.

EXAMPLE 8

A coin-type half-cell was fabricated by the same procedure as in Example 1, except that a 5% aluminum nitrate solution prepared by adding Al(NO$_3$)$_3$ to water was used instead of the 5% Al-isopropoxide solution.

EXAMPLE 9

A coin-type half-cell was fabricated by the same procedure as in Example 1, except that a 5% of aluminum nitrate solution prepared by adding Al(NO$_3$)$_3$ into water, was used instead of the 5% Al-isopropoxide solution, and the heat-treatment was performed at 500° C. instead of 300° C.

EXAMPLE 10

A coin-type half-cell was fabricated by the same procedure as in Example 1, except that a 5% aluminum nitrate solution prepared by adding Al(NO$_3$)$_3$ into water, was used instead of the 5% Al-isopropoxide solution, and the heat-treatment was performed at 700° C. instead of 300° C.

DSC analysis is performed in order to confirm thermal safety of a charge positive active material. In order to be marketable, battery cells should pass various safety test. The nail penetration test, in which a nail is passed through a charged battery cell, is critical for guaranteeing the safety of the battery. The safety of the battery depends on various factors, especially the exothermic reaction caused by reacting the charged positive electrode with electrolyte impregnated in the charged positive electrode.

For example, when a coin cell with a LiCoO$_2$ active material is charged to a pre-determined potential, LiCoO$_2$ is converted to Li$_{1-x}$CoO$_2$. The thermal safety of the charged positive active material Li$_{1-x}$CoO$_2$ was evaluated by measuring the temperature at which an exothermic peak occurs and the quantity of heat evolved from the DSC. Because the Li$_{1-x}$CoO$_2$ active material is unstable, oxygen bonded to cobalt (Co—O) decomposes and releases, when the battery temperature increases. The released oxygen may react with the electrolyte in a cell to cause the cell to burst or explode. Accordingly, the temperature and the quantity of heat evolved when oxygen is decomposed significantly affect the safety of the cell.

Figure 2:
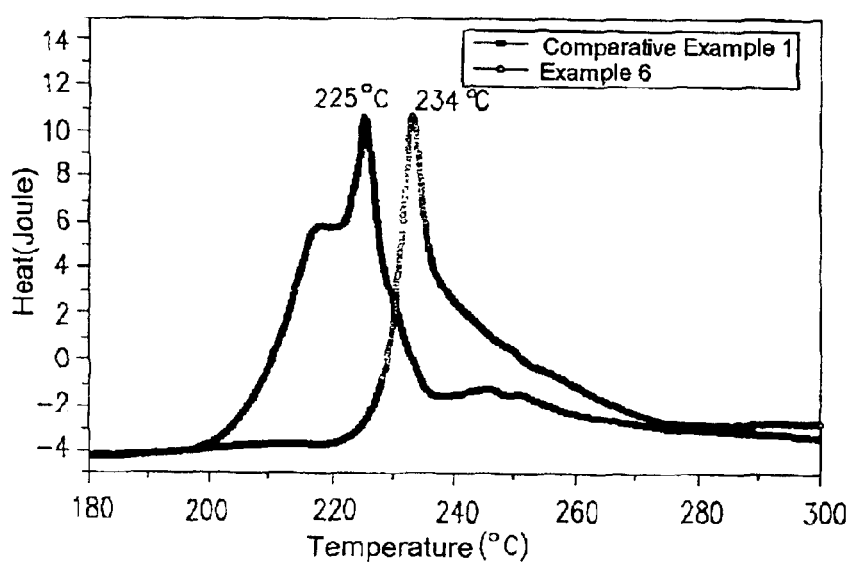
FIG. 2 is a graph illustrating the DSC results of positive active materials according to Example 6 of the present invention and Comparative Example 1.

The coin-type cells according to Examples 1 to 10 and Comparative Example 1 were charged to 4.3 V at 0.1 C-rate. The positive electrode was separated from the coin-cell in the glove box 10 mg of the positive active material was collected from the electrode, and DSC analysis was performed by scanning from 25 to 300° C. with increasing the temperature at a rate of 3° C./min with a DSC analyzer (Perkin Helmer Co.). The results are presented in FIGS. 1 and 2. FIG. 1 shows the DSC results according to Example 4 and Comparative Example 1, and FIG. 2 shows the DSC results according to Example 6 and Comparative Example 1. As shown in FIG. 1, the exothermic temperature of Example 4 (about 214° C.) appears to be higher that of Comparative Example 1 (about 209° C.) and the peak area of Example 1 appears to be smaller than that of Comparative Example 1. Therefore, the positive active material of Example 4 exhibits better thermal safety than that of Comparative Example 1. In this test, the content of each electrolyte immersed in the positive active materials of Example 4 and Comparative Example 1 is 0.006 g, and the charge capacity of Example 4 and Comparative Example 1 is 161 mAh/g.

In addition, as shown in FIG. 2, the exothermic temperature of Example 6 is 234° C., and that of Comparative Example 1 is 225° C. Therefore, the positive active material of Example 6 is much more stable than Comparative Example 1.

EXAMPLE 11

A coin-type half-cell was fabricated by the same procedure as in Example 1, except that a 10% boron ethoxide solution prepared by dissolving 10% $B_2O_3$ powder in 90% ethanol was used instead of the 5% Al-isopropoxide solution.

EXAMPLE 12

A coin-type half-cell was fabricated by the same procedure as in Example 1, except that a 10% boron ethoxide solution prepared by dissolving 10% $B_2O_3$ powder in 90% of ethanol was used instead of the 5% Al-isopropoxide solution, and the heat-treatment was performed at 500° C. instead of 300° C.

EXAMPLE 13

A coin-type half-cell was fabricated by the same procedure as in Example 1, except that a 10% boron ethoxide solution prepared by dissolving 10% $B_2O_3$ powder in 90% ethanol was used instead of the 5% Al-isopropoxide solution, and the heat-treatment was performed at 700° C. instead of 300° C.

EXAMPLE 14

10% $B_2O_3$ powder was dissolved in 90% ethanol to prepare a boron ethoxide solution.

$LiCoO_2$ powder having 10 μm of average diameter was added to the 10% boron ethoxide solution followed by mixing them for about 10 minutes to coat the powder with the solution. The wet mixture was allowed to stand for about 30 minutes to allow the excess solvent to evaporate.

The partially dried mixture was transferred to a furnace. The mixture was heat-treated in the furnace at 300° C. for 10 hours under flowing air (first heat-treatment), and the heat-treated mixture was cooled in the furnace. The first heat-treatment temperature was elevated to 300° C. at a rate of 3° C./min. When the temperature of the furnace was 200° C., the heat-treated material was transferred into the air at ambient temperature and allowed to stand under atmosphere. Then, the cooled material was ground and sieved to collect a boron oxide coated $LiCoO_2$ powder.

The boron ethoxide coated $LiCoO_2$ powder was added to a 1% Al-isopropoxide solution followed by mixing them for about 10 minutes to coat the powder with the solution. The wet mixture was allowed to stand for about 30 minutes to allow the excess solvent to evaporate.

The partially dried mixture was transferred to a furnace. The mixture was heat-treated in the furnace at 300° C. for 10 hours under flowing air (second heat-treatment), and the heat-treated mixture was cooled in the furnace. The second heat-treatment temperature was elevated to 300° C. at a rate of 3° C./min. When the temperature of the furnace was 200° C., the heat-treated material was transferred into the air at ambient temperature and allowed to stand under atmosphere. Then, the cooled material was ground and sieved to collect a powder and to use it as a positive active material coated with a first $B_2O_3$ layer and a second $Al_2O_3$ layer on the first layer.

Using the positive active material, a coin-type half-cell was fabricated by the same procedure as in Example 1.

EXAMPLE 15

A coin-type half-cell was fabricated by the same procedure as in Example 14, except that a 1% a boron ethoxide solution was used instead of the 10% boron ethoxide solution.

EXAMPLE 16

A coin-type half-cell was fabricated by the same procedure as in Example 14, except that a 1% boron ethoxide solution was used instead of the 10% boron ethoxide solution, and the first and second heat-treatment were performed at 500° C. instead of 300° C.

EXAMPLE 17

A coin-type half-cell was fabricated by the same procedure as in Example 14, except that a 1% boron ethoxide solution was used instead of the 10% boron ethoxide solution, and the first and second heat-treatments were performed at 700° C. instead of 300° C.

Figure 3A:
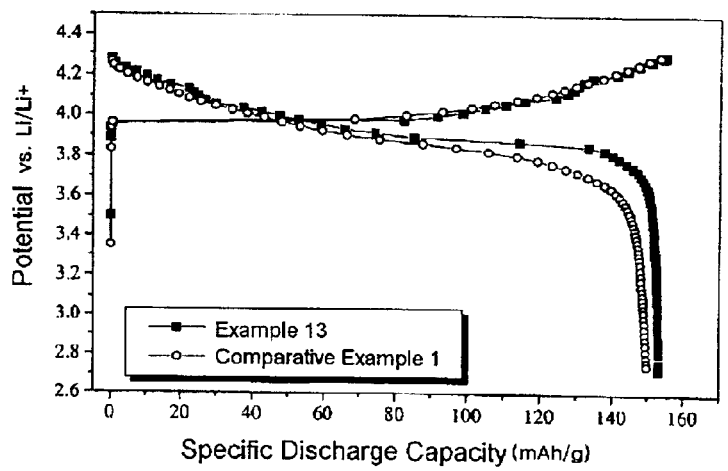
FIG. 3a is a graph illustrating the charge and discharge characteristics of the coin-type cells according to Example 13 of the present invention and Comparative Example 1 at a low rate.

A coin-type half-cell according to Example 13 was charged and discharged at a 0.5 C rate between 4.3 V and 2.75 V, and the result is shown in FIG. 3a. For comparison, that of Comparative Example 1 is shown in FIG. 3a. As shown in FIG. 3a, a discharge potential (voltage) and a capacity characteristic of Example 13 is higher than that of Comparative Example 1. In addition, the half-cells according to Example 13 and Comparative Example 1 were charged and discharged at a 1 C rate between 4.3 to 2.75 V, and the result is shown in FIG. 3b.

Figure 3B:
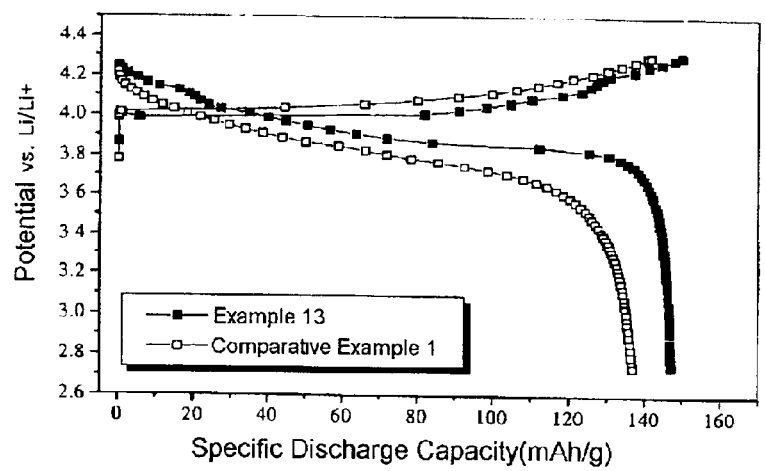
FIG. 3b is a graph illustrating the charge and discharge characteristics of the coin-type cells according to Example 13 of the present invention and Comparative Example 1 at a high rate.
Figure 4:
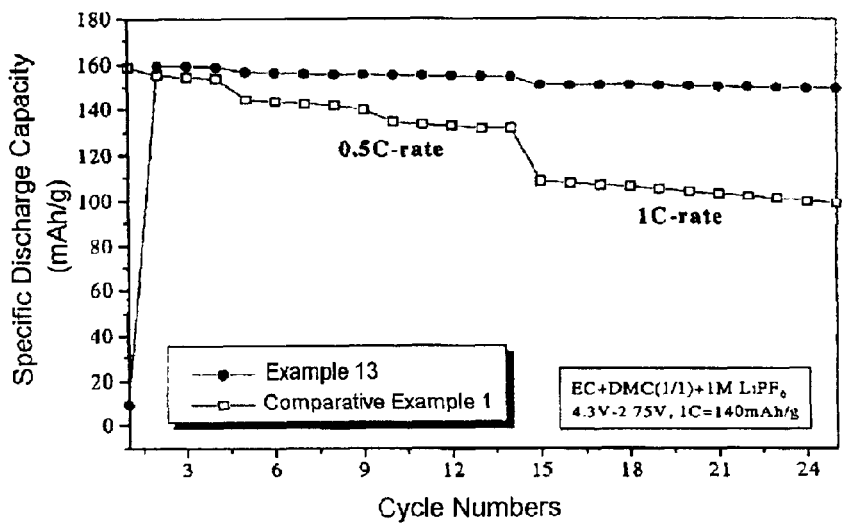
FIG. 4 is a graph illustrating the capacity characteristics of the coin-type cells according to Example 13 of the present invention and Comparative Example 1.

As shown in FIG. 3b, at a high rate, the discharge potential (voltage) of Example 13 is higher than that of Comparative Example 1, and the capacity characteristic of Example 13 is better than that of Comparative Example 1. For easy comparison, the discharge potentials (voltage) in FIG. 3a and FIG. 3b at low and high rates are presented in FIG. 4. The capacity characteristic of Example 13 is better than that of Comparative Example 1.

Figure 5:
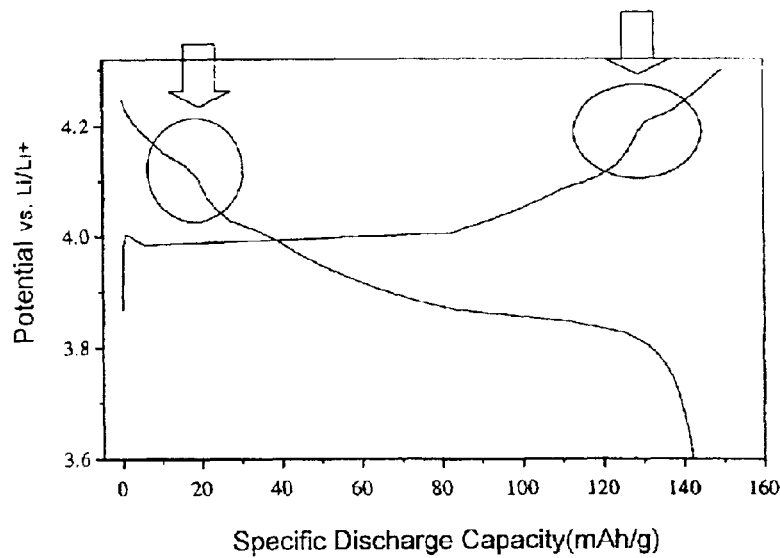
FIG. 5 is an enlarged graph of FIG. 3b illustrating the charge and discharge characteristics of a coin-type cell according to Example 13 of the present invention at a high rate.

As shown in FIG. 3b, the very broad and small peak exhibited in the range of 4.0 to 4.3 V. FIG. 5 shows the enlarged charge and discharge curve of Example 13 in FIG. 3b. It was considered that such a broad and small peak occurred due to a phase transition of the positive active material.

Figure 6:
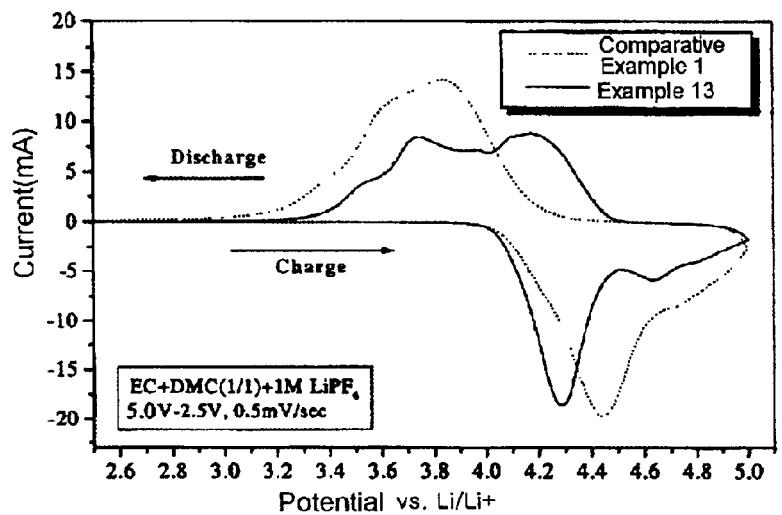
FIG. 6 is a cyclic voltamogram of the coin-type cells according to Example 13 of the present invention and Comparative Example 1.

In order to verify this, the half-cell of Example 13 was analyzed with cyclic voltametry at 0.5 mV/sec and at a voltage ranging from 5.0 to 2.5 V. The cyclic voltamogram result is presented in FIG. 6. For comparison, the cyclic voltamogram result of Comparative Example 1 is presented in FIG. 6. The positive active material of Comparative Example 1 exhibited one peak during the charge and discharge. On the other hand, two peaks during the charge and discharge appear in the voltamogram of Example 13. The result appears to indicate that the structure of the positive active material of Example 13 is modified during the charge and discharge.

Figure 7:
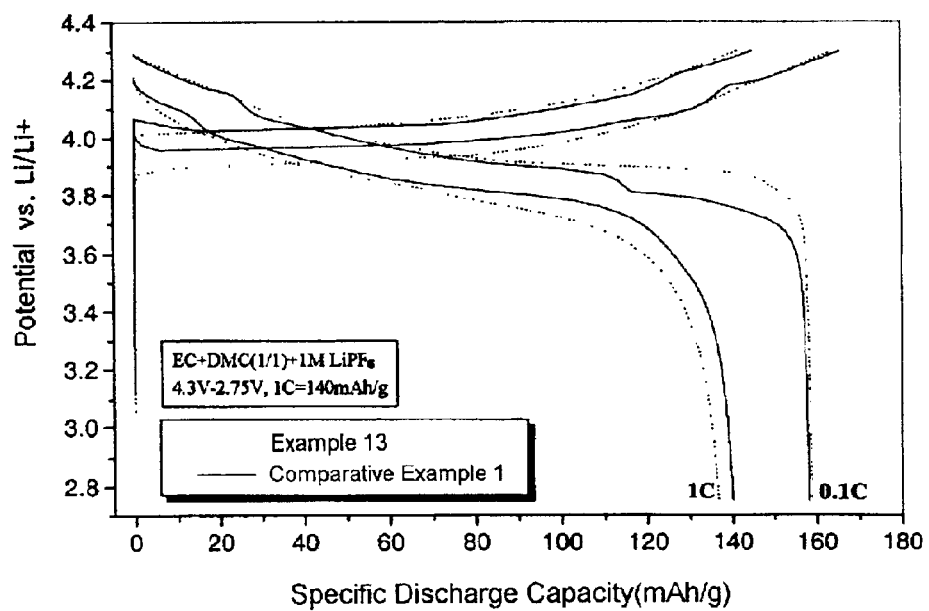
FIG. 7 is a graph showing the charge and discharge curves according to Example 17 of the present invention and Comparative Example 1 respectively at 0.1 C and 1 C.

The coin-type half-cell of Example 17 was charged and discharged in a voltage ranging from 4.3 to 2.75 V, and respectively at rates of 0.1 C and 1 C. The charge and discharge curves are presented in FIG. 7. As shown in FIG. 7, a very broad and small peak occurs between 4.0 to 4.3 V. The result also appears to indicate that the structure of the positive active material of Example 17 is modified at potentials between 4.0 and 4.3 V.

Figure 8:
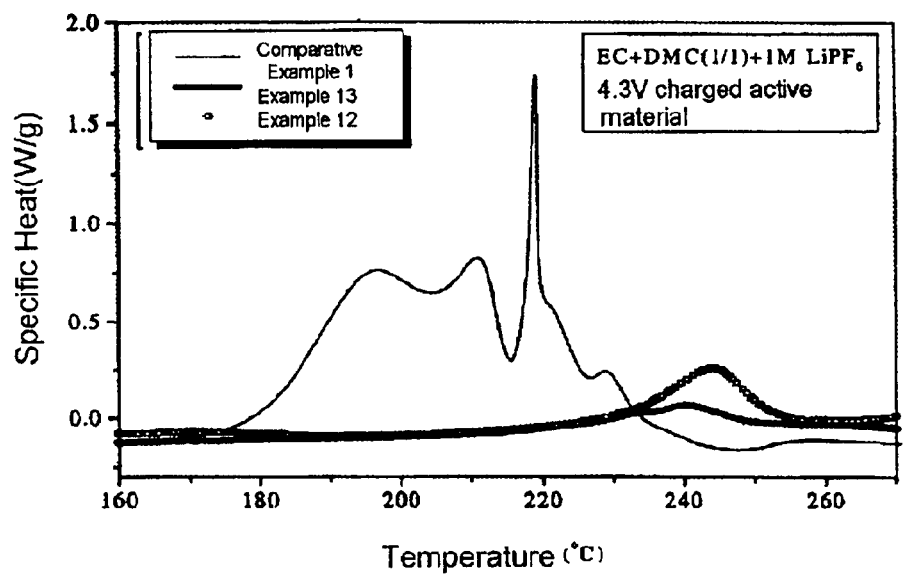
FIG. 8 is a graph illustrating the DSC results of positive active materials according to Example 12 and Example 13 of the present invention and Comparative Example 1.

The coin-type half-cells according to Examples 11 to 17 were charged at 4.3 V. The positive electrode was separated from the charged cell, and 10 mg of the positive active material on Al-foil was collected from the electrode and analyzed with 910 DSC (TA instrument Co.). The DSC analysis was performed by scanning from 25 to 300° C. with increasing the temperature at a rate of 3° C./min under the atmosphere. The DSC results of Example 12 and 13 are presented in FIG. 8.

It was shown from the DSC analysis results that one or more oxide layers act to stabilize the crystalline structure of $LiCoO_2$. It is expected that the stable crystalline structure of $LiCoO_2$ may serve to stabilize the bond between cobalt and oxygen. In addition, it was shown from the DSC analysis results that the coating layer, such as $Al_2O_3$, $SiO_2$, or $B_2O_3$, acts to prevent reaction between the positive active material and the electrolyte and the oxidation of the electrolyte.

Twenty cylindrical cells with 2000 mAh using the positive active materials according to Comparative Example 1 and Examples 15 to 17 were fabricated. Tests for the safety categories of burning, heat-exposure, and overcharging were performed. The burning test results are shown as the percentage of cells which burst when heated with a burner. The heat-exposure test results are shown as the duration of time at 150° C. before the cell burst. The overcharging test results are shown as the percentage of the cells which leaked when they are overcharged at 1 C rate. The results are summarized in Table 1.

TABLE 1

|  | Comparative Example 1 | Example 15 | Example 16 | Example 17 |
| --- | --- | --- | --- | --- |
| Burst percentage | 90% | 0% | 0% | 0% |
| Average Time-to-burst (Heat exposure) | 11 min | 12 min | 15 min | 20 min |
| Leakage percentage (1C-overcharge) | 100% | 30% | 10% | 0% |

EXAMPLE 18

A coin-type half-cell was fabricated by the same procedure as in Example 13, except that a $Li_{1.03}Ni_{0.69}Mn_{0.19}Co_{0.1}Al_{0.07}Mg_{0.07}O_2$ powder having a 10 µm average diameter and a 1% boron ethoxide solution were used instead of $LiCoO_2$ and the 10% boron ethoxide solution.

EXAMPLE 19

A coin-type half-cell was fabricated by the same procedure as in Example 13, except that a $LiNi_{0.9}Co_{0.1}Sr_{0.002}O_2$ powder having a 10 µm average diameter and a 1% boron ethoxide solution were used instead of $LiCoO_2$ and the 10% boron ethoxide solution.

EXAMPLE 20

A coin-type half-cell was fabricated by the same procedure as in Example 14, except that a $Li_{1.03}Ni_{0.69}Mn_{0.19}Co_{0.1}Al_{0.07}Mg_{0.07}O_2$ powder having a 10 µm average diameter and a 1% boron ethoxide solution were used instead of $LiCoO_2$ and the 10% boron ethoxide solution, and the first and second heat-treatments were performed at 700° C. instead of 300° C.

EXAMPLE 21

A coin-type half-cell was fabricated by the same procedure as in Example 14, except that a $LiNi_{0.9}Co_{0.1}Sr_{0.002}O_2$ powder having a 10 µm average diameter and a 1% boron ethoxide solution were used instead of $LiCoO_2$ and the 10% boron ethoxide solution, and the first and second heat-treatments were performed at 700° C. instead of 300° C.

EXAMPLE 22

A coin-type half-cell was fabricated by the same procedure as in Example 15, except that a $LiNi_{0.9}Co_{0.1}Sr_{0.002}O_2$ powder having a 10 µm average diameter was used instead of $LiCoO_2$.

EXAMPLE 23

A coin-type half-cell was fabricated by the same procedure as in Example 16, except that a $LiNi_{0.9}Co_{0.1}Sr_{0.002}O_2$ powder having a 10 µm average diameter was used instead of $LiCoO_2$.

EXAMPLE 24

A coin-type half-cell was fabricated by the same procedure as in Example 15, except that a $LiMn_2O_4$ powder having a 20 µm average diameter was used instead of $LiCoO_2$.

EXAMPLE 25

A coin-type half-cell was fabricated by the same procedure as in Example 16, except that a $LiMn_2O_4$ powder having a 20 µm average diameter was used instead of $LiCoO_2$.

EXAMPLE 26

A coin-type half-cell was fabricated by the same procedure as in Example 17, except that a $LiMn_2O_4$ powder having a 20 µm average diameter was used instead of $LiCoO_2$.

Figure 9:
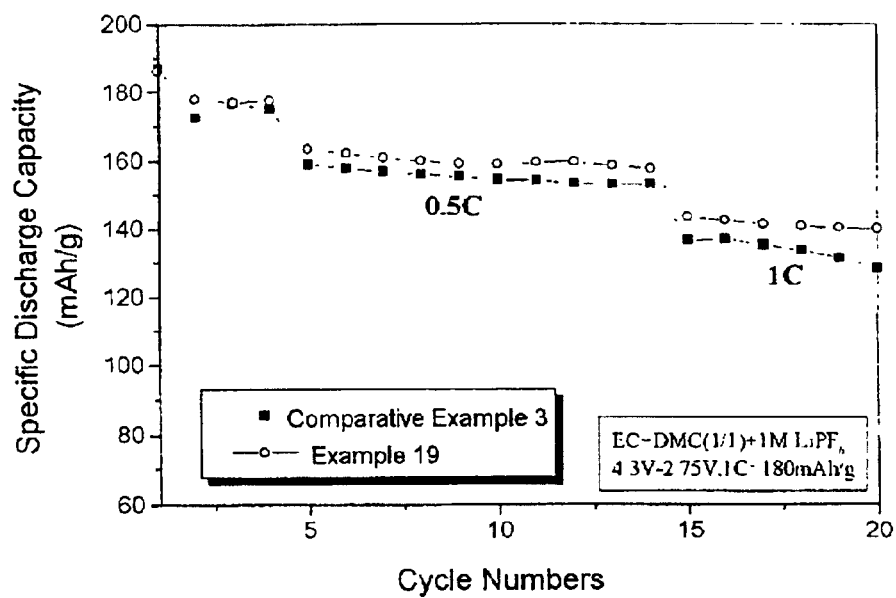
FIG. 9 is a graph showing the rate capabilities of the coin-type cells according to Example 19 of the present invention and Comparative Example 3.

The coin-type half-cells with the positive active materials according to Examples 18 to 26 and Comparative Examples 2 to 4 were charged and discharged between 4.3 V to 2.75 V, varying the charge and discharge rates (current density) in the sequence of 0.1 C (1 cycle), 0.2 C (3 cycles), 0.5 C (10 cycles), and 1 C (6 cycles), and the cycle life characteristics were measured. The cycle life characteristics of the coin-type half-cells according to Examples 19 and Comparative Example 3 are presented in FIG. 9. It was evident from FIG. 9 that the coin-type half-cell according to Example 19 exhibited better cycle life characteristics than that according to Comparative Example 3.

The coin-type half-cells according to Example 18 and Example 19 were charged to 4.3 V at 0.1 C-rate. The positive electrode was separated from the charge cell in the glove box, 10 mg of the positive active material was collected from the positive electrode, and DSC analysis was performed by scanning from 25 to 300° C. while increasing the temperature at a rate of 3° C./min with a 910 DSC (TA instrument Co.).

The $Li_{1.03}Ni_{0.69}Mn_{0.19}Co_{0.1}Al_{0.07}Mg_{0.07}O_2$ positive active material according to Comparative Example 2 and the $LiNi_{0.9}Co_{0.1}Sr_{0.002}O_2$ positive active material according to Comparative Example 3 were analyzed with DSC.

Figure 10:
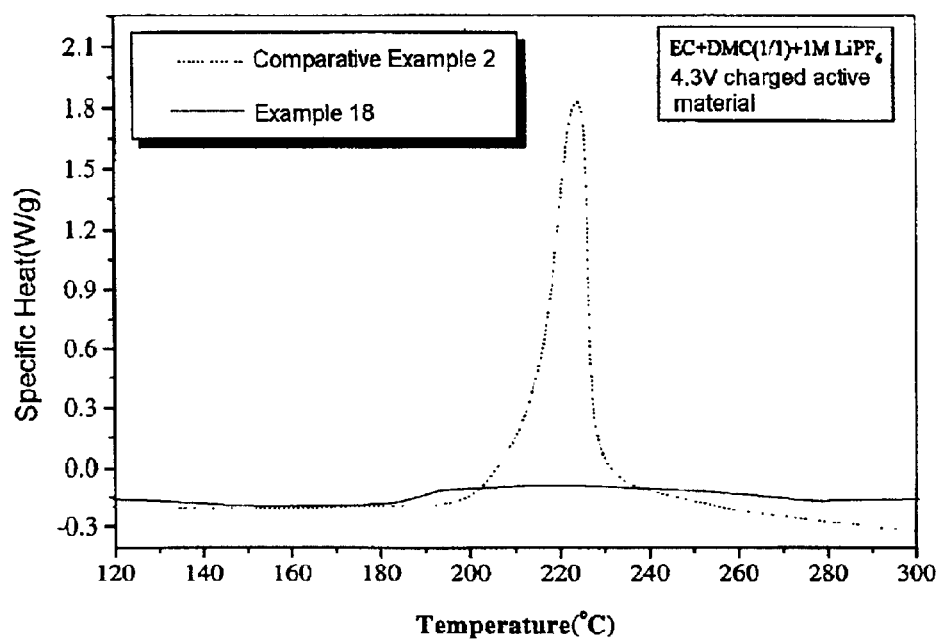
FIG. 10 is a graph illustrating the DSC results of positive active materials according to Example 18 of the present invention and Comparative Example 2.
Figure 11:
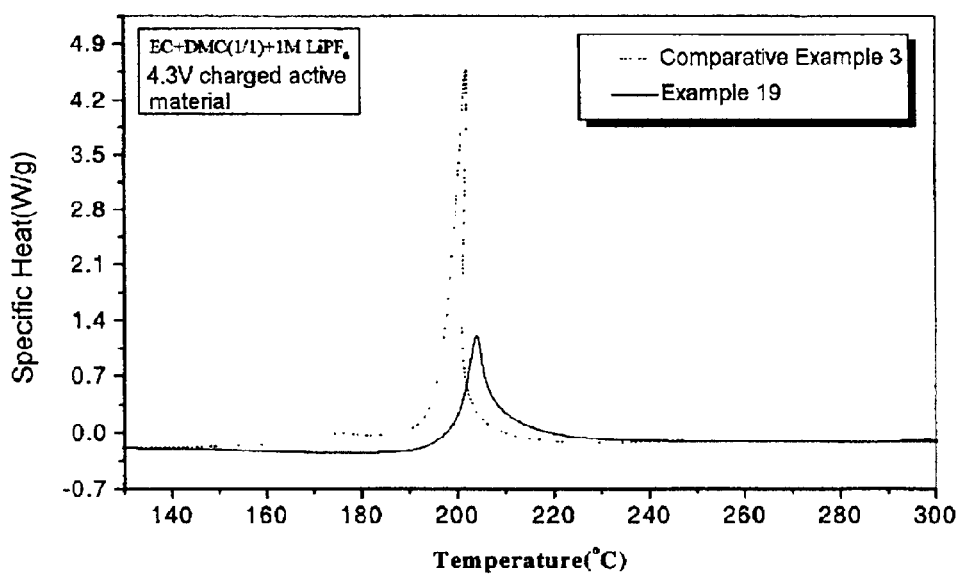
FIG. 11 is a graph illustrating the DSC results of positive active materials according to Example 19 of the present invention and Comparative Example 3.

The DSC results of Example 18 and Comparative Example 2 are presented in FIG. 10, and the DSC results of Example 19 and Comparative Example 3 are presented in FIG. 11.

The coin-type half-cells according to Example 18 and Comparative Example 2 were charged to 4.45 V at 0.1 C-rate. The positive electrode was separated from the charged cells in a glove box, 10 mg of the positive active material was collected from the positive electrode, and DSC analysis was performed by scanning from 25 to 300° C. while increasing the temperature at a rate of 3° C./min.

Figure 12:
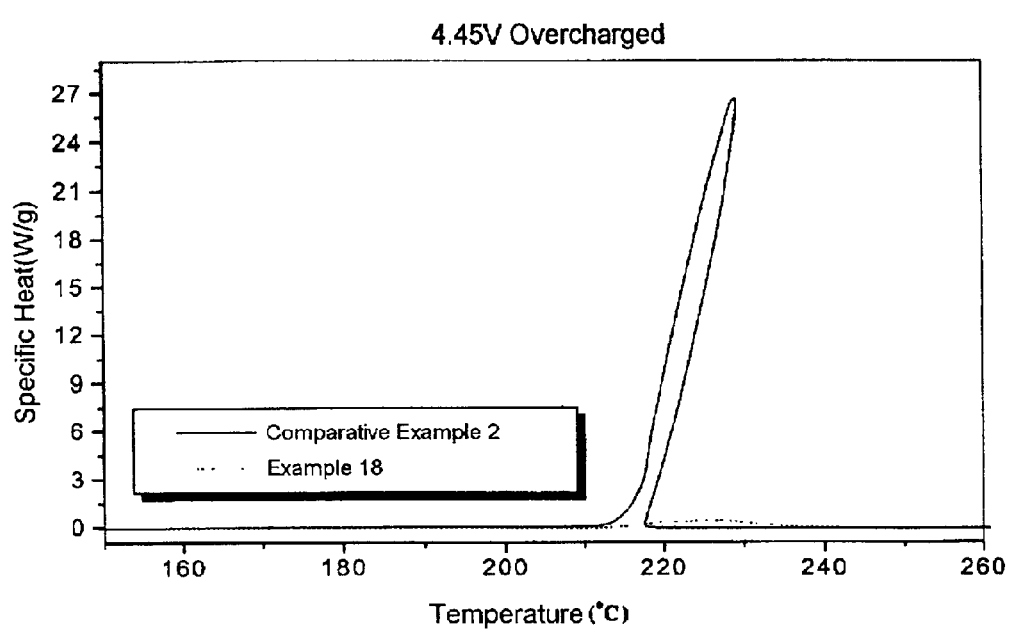
FIG. 12 is a graph illustrating the DSC results of overcharged positive active materials according to Example 18 of the present invention and Comparative Example 2.

As shown in FIG. 10, the exothermic peak of Comparative Example 2 occurred at about 220° C. On the other hand, Example 18 had no exothermic peak. The result indicates that the amount of heat evolved in Example 18 was dramatically less than that of Comparative Example 2, and the positive active material of the present invention exhibits better thermal safety. In addition, FIG. 11 shows that the positive active material of Example 19 exhibits better thermal safety than Comparative Example 3. FIG. 12 shows that the positive active material of Example 18 exhibits better thermal safety than Comparative Example 2. The DSC results of the positive active materials according to the other Examples indicated the positive active materials of these Examples have better thermal safety.

The positive active material for a rechargeable lithium battery of the present invention includes one or more surface-treatment layers having one or more coating elements. Thus, the positive active material exhibits enhanced thermal safety and can provide a rechargeable lithium battery with better thermal safety.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery comprising:
   a core comprising a lithiated compound; and
   at least two different oxide layers formed on the core wherein the oxides are selected from the group consisting of oxides of Mg, Al, Co, K, Na, Ca, Si, Ti, Sn, V, Ge, Ga, B, As, and Zr.

2. The positive active material according to claim 1, wherein the lithiated compound is at least one compound selected from the group consisting of compounds represented by the formulas 1 to 11:

| | |
|---|---|
| $Li_xMn_{1-y}M'_yA_2$ | (1) |
| $Li_xMn_{1-y}M'_yO_{2-z}X_z$ | (2) |
| $Li_xMn_2O_{4-z}A_z$ | (3) |
| $Li_xMn_{2-y}M'_yA_4$ | (4) |
| $Li_xM_{1-y}M''_yA_2$ | (5) |
| $Li_xMO_{2-z}A_z$ | (6) |
| $Li_xNi_{1-y}Co_yO_{2-z}A_z$ | (7) |
| $Li_xNi_{1-y-z}Co_yM''_zA_\alpha$ | (8) |
| $Li_xNi_{1-y-z}Co_yM''_zO_{2-\alpha}A_\alpha$ | (9) |
| $Li_xNi_{1-y-z}Mn_yM'_zA_\alpha$ | (10) |
| $Li_xNi_{1-y-z}Mn_yM'_zO_{2-\alpha}X_\alpha$ | (11) | wherein:
$0.95 \leq x \leq 1.1$, $0 \leq y \leq 0.5$, $0 \leq z \leq 0.5$, $0 < \alpha \leq 2$,
M is Ni or Co,
M' is at least one element selected from the group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa,
M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa,
A is selected from the group consisting of O, F, S, and P, and
X is selected from the group consisting of F, S and P.

3. The positive active material for a rechargeable lithium battery according to claim 1, wherein the oxide layers each range from $2 \times 10^{-5}$ to 1 wt % based on the weight of the positive active material.

4. The positive active material for a rechargeable lithium battery according to claim 3, wherein the oxide layers each range from 0.001 to 1 wt % based on the weight of the positive active material.

5. A positive active material for a rechargeable lithium battery comprising:
   a core comprising at least one lithiated compound; and
   at least two different surface-treatment oxide layers formed sequentially on the core wherein the oxides are selected from the group consisting of oxides of Mg, Al, Co, K, Na, Ca, Si, Ti, Sn, V, Ge, Ga, B, As, and Zr.

6. The positive active material according to claim 5, wherein the lithiated compound is at least one compound selected from the group consisting of compounds represented by the formulas 1 to 11:

| | |
|---|---|
| $Li_xMn_{1-y}M'_yA_2$ | (1) |
| $Li_xMn_{1-y}M'_yO_{2-z}X_z$ | (2) |
| $Li_xMn_2O_{4-z}A_z$ | (3) |
| $Li_xMn_{2-y}M'_yA_4$ | (4) |
| $Li_xM_{1-y}M''_yA_2$ | (5) |
| $Li_xMO_{2-z}A_z$ | (6) |
| $Li_xNi_{1-y}Co_yO_{2-z}A_z$ | (7) |
| $Li_xNi_{1-y-z}Co_yM''_zA_\alpha$ | (8) |
| $Li_xNi_{1-y-z}Co_yM''_zO_{2-\alpha}X_\alpha$ | (9) |
| $Li_xNi_{1-y-z}Mn_yM'_zA_\alpha$ | (10) |
| $Li_xNi_{1-y-z}Mn_yM'_zO_{2-\alpha}X_\alpha$ | (11) | wherein:
$0.95 \leq x \leq 1.1$, $0 \leq y \leq 0.5$, $0 \leq z \leq 0.5$, $0 < \alpha 2$,
M is Ni or Co,
M' is at least one element selected from the group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa, M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa, A is selected from the group consisting of O, F, S, and P, and X is selected from the group consisting of F, S, and P.

7. The positive active material according to claim 5, wherein the oxide layers each range from $2 \times 10^{-5}$ to 1 wt % based on the weight of the positive active material.

8. The positive active material according to claim 7, wherein the oxide layers each range from 0.001 to 1 wt % based on the weight of the positive active material.

9. A method of preparing a positive active material for a rechargeable lithium battery comprising:

coating a lithiated compound with a first organic solution or aqueous solution including at least one oxide-forming compound;

heat-treating the coated compound to form a first coating;

coating the lithiated compound with a second organic solution or aqueous solution including at least one oxide-forming compound; and heat treating the coated compound to form a second oxide coating wherein the oxides of the first and second oxide coatings are different from one another and each oxide is selected from the group consisting of oxides of Mg, Al, Co, K, Na, Ca, Si, Ti, Sn, V, Ge, Ga, B, As, and Zr.

10. The method according to claim 9, wherein the lithiated compound is at least one compound selected from the group consisting of compounds represented by the formulas 1 to 11:

| | |
|---|---|
| $Li_xMn_{1-y}M'_yA_2$ | (1) |
| $Li_xMn_{1-y}M'_yO_{2-z}X_z$ | (2) |
| $Li_xMn_2O_{4-z}A_z$ | (3) |
| $Li_xMn_{2-y}M'_yA_4$ | (4) |
| $Li_xM_{1-y}M''_yA_2$ | (5) |
| $Li_xMO_{2-z}A_z$ | (6) |
| $Li_xNi_{1-y}Co_yO_{2-z}A_z$ | (7) |
| $Li_xNi_{1-y-z}Co_yM''_zA_\alpha$ | (8) |
| $Li_xNi_{1-y-z}Co_yM''_zO_{2-\alpha}X_\alpha$ | (9) |
| $Li_xNi_{1-y-z}Mn_yM'_zA_\alpha$ | (10) |
| $Li_xNi_{1-y-z}Mn_yM'_zO_{2-\alpha}X_\alpha$ | (11) | wherein:

$0.95 \leq x \leq 1.1$, $0 \leq y \leq 0.5$, $0 \leq z \leq 0.5$, $0 < \alpha \leq 2$, M is Ni or Co, M' is at least one element selected from the group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa, M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa, A is selected from the group consisting of O, F, S, and P, and X is selected from the group consisting of F, S, and P.

11. The method according to claim 9, wherein the oxide layers each comprise from 0.1 to 50 wt % based on the weight of the positive active material.

12. The method according to claim 11, wherein the oxide layers each comprise from 1 to 20 wt % based on the weight of the positive active material.

13. The method according to claim 9, wherein at least one of the heat-treatment steps is performed at a temperature ranging from 200 to 800° C. for 1 to 20 hours.

14. The method according to claim 9, wherein at least one of the heat-treatment steps is performed under flowing dry air.

15. The method according to claim 9, wherein the coating and the heat-treatment steps are performed three or more times.

16. A positive active material for a rechargeable lithium battery comprising:

a core comprising a lithium-cobalt chalcogenide compound; and at least two different oxide layers sequentially formed on the core, wherein one of the two oxide layers comprises $Al_2O_3$ and the other of the two oxide layers is selected from the group consisting of oxides of Mg, Co, K, Na, Ca, Si, Ti, Sn, V, Ge, Ga, B, As, and Zr.

17. The positive active material of claim 16, wherein the content of Al of the oxide layer ranges from $2 \times 10^{-5}$ to 2 percent by weight based on the weight of the positive active material.

18. The positive active material of claim 17, wherein the content of Al of the oxide layer ranges from 0.001 to 2 percent by weight based on the weight of the positive active material.

19. A positive active material for a rechargeable lithium comprising:

a core comprising a lithium-manganese or lithium-cobalt chalcogenide compound; and at least two different oxide layers sequentially formed on the core, wherein one of the layers comprises an oxide of B and the other of the oxide layers comprises an oxide selected from the group consisting of oxides of Mg, Al, Co, K, Na, Ca, Si, Ti, Sn, V, Ge, Ga, As, and Zr.

20. The positive active material of claim 19, wherein the content of B of the oxide layer ranges from $2 \times 10^{-5}$ to 2 wt % based on the weight of the positive active material.

21. The positive active material of claim 20, wherein the content of B of the oxide layer ranges from 0.001 to 2 wt % based on the weight of the positive active material.

\* \* \* \* \*